(12) United States Patent
Sato et al.

(10) Patent No.: US 7,210,285 B2
(45) Date of Patent: May 1, 2007

(54) INTERNAL COMBUSTION ENGINE EXHAUST GAS PURIFYING SYSTEM

(75) Inventors: Hitoshi Sato, Fujisawa (JP); Naofumi Ochi, Fujisawa (JP); Masashi Gabe, Fujisawa (JP); Takehito Imai, Fujisawa (JP); Takashi Urata, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/658,259

(22) Filed: Sep. 10, 2003

(65) Prior Publication Data
US 2004/0055287 A1 Mar. 25, 2004

(30) Foreign Application Priority Data
Sep. 17, 2002 (JP) .............................. 2002-270206

(51) Int. Cl.
*F01N 3/00* (2006.01)
(52) U.S. Cl. .............................. 60/295; 60/274; 60/285; 60/297; 60/311
(58) Field of Classification Search ................. 60/285, 60/295, 297, 311
See application file for complete search history.

(56) References Cited

U.S. PATENT DOCUMENTS

| 4,211,075 A | * | 7/1980 | Ludecke et al. ............... 60/285 |
| 4,535,588 A | * | 8/1985 | Sato et al. ...................... 60/286 |
| 4,902,487 A | * | 2/1990 | Cooper et al. ............ 423/215.5 |
| 5,207,990 A | * | 5/1993 | Sekiya et al. ................. 422/183 |
| 5,746,989 A | * | 5/1998 | Murachi et al. ........... 423/213.7 |
| 6,594,990 B2 | * | 7/2003 | Kuenstler et al. ............... 60/295 |
| 2004/0123584 A1 | * | 7/2004 | Schaller ....................... 60/274 |

FOREIGN PATENT DOCUMENTS

| JP | 2002-180816 | * | 6/2002 |
| JP | 2002-195086 | * | 7/2002 |
| JP | 2002-106327 |   | 10/2002 |

* cited by examiner

*Primary Examiner*—Thomas Denion
*Assistant Examiner*—Diem Tran
(74) *Attorney, Agent, or Firm*—Staas & Halsey LLP

(57) ABSTRACT

An internal combustion engine exhaust gas purifying system (10) having a continuous regenerating diesel particulate filter system (3) on the exhaust passage (2) of an internal combustion engine (1) is constituted by including collected-quantity estimation means (5A) for estimating the quantity of collected particulate matter in a filter (3b) of the filter system for collecting the particulate matter and maximum-fuel-injection-quantity restricting means (5C) for restricting the maximum fuel injection quantity of the internal combustion engine (1) when the quantity of collected particulate matter estimated by the collected-quantity estimation means (51A) is equal to or more than a predetermined judgment value.

Thereby, when the quantity of deposited particulate matter exceeds a predetermined value in the continuous regenerating DPF system (3), it is possible to prevent the continuous regenerating DPF system (1) from deteriorating by restricting the maximum fuel injection quantity of the internal combustion engine (1) and avoiding a great increase of an exhaust gas quantity.

6 Claims, 5 Drawing Sheets

Fig.5
(a) DPF differential pressure between the upstream and downstream
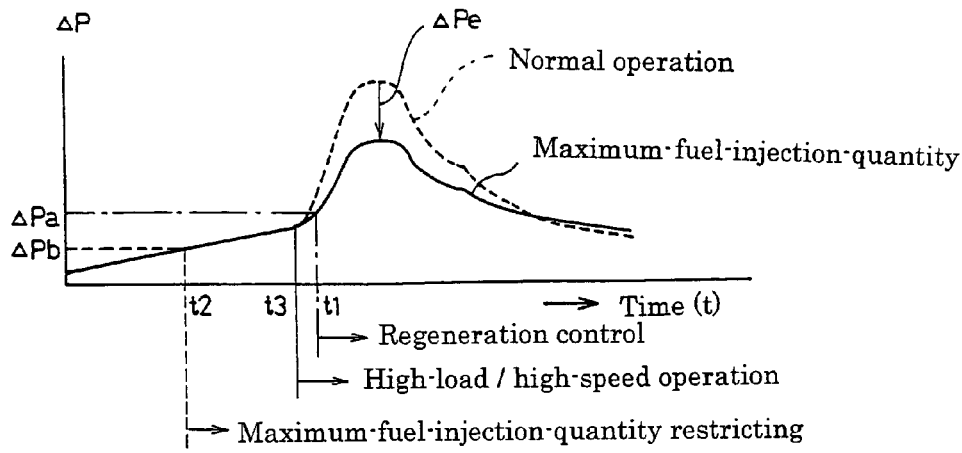
(b) DPF differential pressure between the upstream and downstream
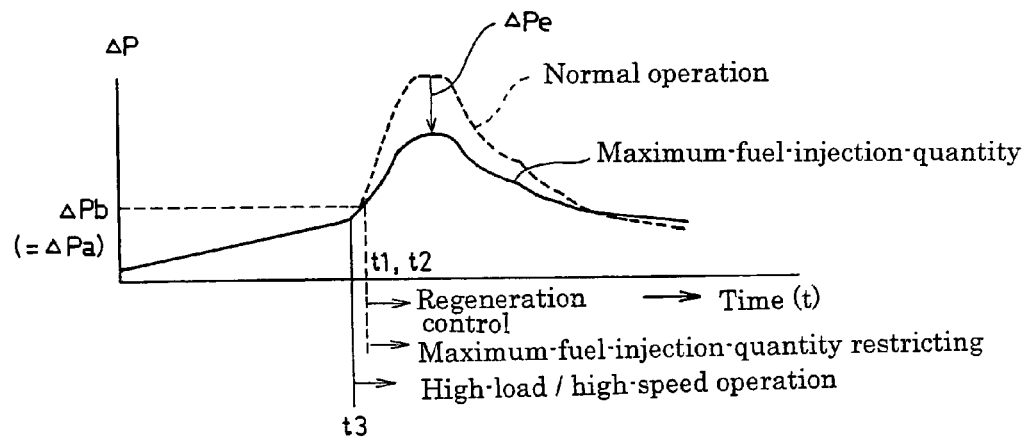
Fig.6
DPF differential pressure between the upstream and downstream
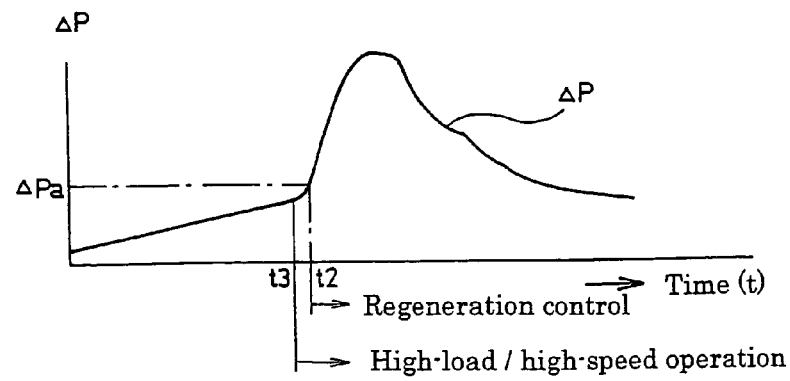

INTERNAL COMBUSTION ENGINE EXHAUST GAS PURIFYING SYSTEM

BACKGROUND OF THE INVENTION

The present invention relates to an internal combustion engine exhaust gas purifying system having a continuous regenerating diesel particulate filter (hereafter referred to as DPF) for collecting particulate matter (hereafter referred to as PM) of a diesel internal combustion engine and purifying exhaust gas.

The quantity of PM permitted to be exhausted from a diesel internal combustion engine has been more strictly regulated, together with NOx, CO, and HC emissions, year by year. Therefore, a technique for collecting the PM with a filter referred to as a DPF and reducing the quantity of the PM to be exhausted to the outside has been developed.

A PM-collecting DPF includes a ceramic such types as a monolith-honeycomb wall-flow filter and a fibrous filter formed by fibrous ceramic or metal. An exhaust gas purifying system using one of these DPFs is set in the middle of the exhaust passage of an internal combustion engine the same as the case of other exhaust gas purifying systems to purify and exhaust the exhaust gas produced in the internal combustion engine.

However, clogging of the PM-collecting DPF progresses as more PM is collected, and the exhaust gas pressure rises proportionally to the quantity of collected PM. Therefore, because of the necessity of removing PM from the DPF, several methods and systems have been developed.

As such systems, the following have been proposed: a system for regenerating a filter by using two exhaust passages and alternately collecting PM and burning the collected PM with a DPF set to each exhaust passage and a continuous regenerating system for oxidizing and removing the collected PM by forming one exhaust passage and controlling the internal combustion engine with the purpose of regenerating the filter while collecting the PM with a DPF set to the exhaust passage.

These continuous regenerating type systems include a continuous regenerating DPF type referred to as a CRT (Continuously Regenerating Trap) provided with an oxidation catalyst on the upstream side of a DPF system and a DPF type referred to as a CSF (Catalyst Soot Filter) for burning PM with an exhaust gas by lowering the combustion temperature of the PM in accordance with the action of a catalyst carried by a filter.

The CRT-type continuous regenerating DPF system, for example as disclosed in the Japanese Patent Laid-Open No. 2002-106327, exploits the fact that PM is oxidized with nitrogen dioxide at a lower temperature than oxidizing the PM with oxygen in an exhaust gas, which is constituted of an oxidation catalyst and a filter. The PM is removed by oxidizing nitrogen monoxide (NO) in an exhaust gas on the upstream-side oxidation catalyst carrying platinum or the like to produce nitrogen dioxide ($NO_2$) and oxidizing the collected PM in a downstream-side filter with the nitrogen dioxide ($NO_2$) to produce carbon dioxide ($CO_2$).

Moreover, the CSF-type continuous regenerating DPF system is constituted of a catalyst-provided filter with such a catalyst as cerium oxide ($CeO_2$). Furthermore, at a low temperature (300° to 600° C.), PM is oxidized utilizing a reaction such as ($4CeO_2+C \rightarrow 2Ce_2O_3+CO_2$, $2CeO_3+O_2 \rightarrow 4CeO_2$) using oxygen in the exhaust gas in the catalyst-provided filter. When PM is kept in a high temperature zone higher than the temperature at which the PM is burned with oxygen in an exhaust gas (such as 600° C. or higher), the PM is oxidized with oxygen in the exhaust gas.

However, in the case of a low exhaust temperature or an operation of low nitrogen monoxide (NO) exhausted, also in these continuous regenerating DPF systems, a catalyst temperature is lowered and thereby a catalyst activity is deteriorated or nitrogen monoxide (NO) runs short. Therefore, the above reaction does no occur. Therefore, because a filter cannot be regenerated by oxidizing PM, deposition of the PM on the filter is continued and the filter is clogged.

Therefore, in the case of these continuous regenerating DPF systems, regeneration control is performed by estimating the quantity of the deposited PM in accordance with the differential pressure between upstream and downstream of a DPF when regenerating the filter, changing the present operation state of an internal combustion engine to a regenerating-mode operation when the differential pressure exceeds a predetermined judgment value. In the regeneration control, the collected PM in a filter is oxidized and removed by forcibly raising the exhaust temperature or increasing the quantity of nitrogen monoxide (NO) or nitrogen dioxide ($NO_2$).

In the case of a conventional continuous regenerating DPF system, regeneration control is performed in which the timing for starting the regenerating-mode operation is judged according to when closing of the filter as progressed and the quantity of an estimated deposited-PM or a differential pressure becomes a predetermined judgment value or more and the regenerating-mode operation being started independently of the operation state of the internal combustion engine at the time of the above judgment.

However, when the quantity of collected PM at or before start of the regenerating-mode operation is close to its upward-limit quantity, internal combustion engine operating conditions may be affected. Moreover, when a large-load operation or full-load is started while the quantity of collected PM is close to the upward-limit value and the flow rate of exhaust gas is greatly increased, the problem that the differential pressure $\Delta P$ between the upstream and downstream of a DPF is greatly raised as shown in FIG. 6 occurs.

When the differential pressure $\Delta P$ is greatly raised, the service life of the DPF is shortened because deterioration of the DPF is accelerated, and the great rise of the differential pressure $\Delta P$ is also disadvantageous from the viewpoint of fuel efficiency. Moreover, when using a large-capacity DPF system capable of allowing a sudden rise in the exhaust gas flow rate, a problem occurs in layout or cost.

BRIEF SUMMARY OF THE INVENTION

The present invention is made to solve the above problems and its object is to provide an internal combustion engine exhaust gas purifying system capable of preventing an internal combustion engine continuous regenerating DPF system from deteriorating by restricting the maximum fuel injection quantity of the internal combustion engine and avoiding a great increase in exhaust gas quantity when the quantity of deposited-PM exceeds a predetermined value in the continuous regenerating DPF system.

An internal combustion engine exhaust gas purifying system for achieving the above object is an internal combustion engine exhaust gas purifying system having a continuous regenerating DPF system in an exhaust passage of an internal combustion engine to oxidize and remove collected PM by performing the regenerating-mode operation when the quantity of collected-PM becomes the predetermined judgment value or more in a filter of the filter system for collecting PM, which comprises collected-quantity estimation means for estimating the quantity of collected PM in the filter and a maximum-fuel-injection-quantity restricting means for restricting the maximum fuel injection quantity of an internal combustion engine when the quantity of collected PM estimated by the collected-quantity estimation means becomes the predetermined judgment value or more.

The above configuration makes it possible to restrict the maximum fuel injection quantity of an internal combustion engine, prevent an exhaust gas quantity from suddenly increasing, and prevent a DPF from deteriorating.

Moreover, the internal combustion engine exhaust gas purifying system comprises a restriction indicating means for indicating restriction of the maximum fuel injection quantity of an internal combustion engine when or while the maximum-fuel-injection-quantity restricting means restricts the maximum fuel injection quantity. Thereby, it is possible to indicate that while a filter is regenerated, an ability to vary the output of the internal combustion engine output is restricted to the driver of the vehicle in which the internal combustion engine exhaust gas purifying system is mounted. Thus, the driver can perform accurate judgment and driving.

Moreover, estimation of the quantity of collected PM or judgment of the quantity when the regenerating mode is to be started in the filter is performed through comparison of the difference or ratio between exhaust gas pressures at the upstream and downstream of the filter with a predetermined judgment value, or through comparison between an accumulated deposited quantity obtained by estimating the quantity of deposited PM in the filter in accordance with the difference between a PM quantity exhausted in an operating state of an internal combustion engine and a PM quantity to be oxidized and removed and a predetermined judgment value.

Furthermore, by particularly constituting the collected-quantity estimation means so as to estimate the quantity of collected PM in accordance with the difference between pressures at the upstream and downstream of the filter, it is possible to estimate the quantity of deposited PM in accordance with a comparatively simple measuring system and a comparatively easy algorithm.

Furthermore, as the continuous regenerating DPF system, it is possible to use one of the following three systems: a system constituted by making the filter carrying a catalyst, a system constituted by setting an oxidation catalyst to the upstream side of the filter, and a system constituted by making the filter carrying a catalyst and setting an oxidation catalyst to the upstream side of the filter.

According to an internal-combustion-engine exhaust gas purifying system of the present invention, when the quantity of deposited PM becomes lager than a predetermined judgment value, it is possible to prevent an exhaust gas quantity from increasing by restricting the maximum fuel injection quantity of an internal combustion engine. Thereby, it is possible to prevent a lot of exhaust gas from being produced in a state of close to a clogged state. Therefore, it is possible to prevent a continuous regenerating DPF system from deteriorating under the effect of increase of the differential pressure between the upstream and downstream of the filter for collecting PM, or prevent exhaust gas pressure and a fuel cost from increasing.

Moreover, by adding restriction indicating means to a continuous regenerating DPF system, it is possible to indicate that the quantity of collected PM in a continuous DPF system exceeds the predetermined judgment value, that the maximum fuel injection quantity is restricted, and that ability to vary the output of an internal combustion engine is restricted to the driver of the vehicle in which the system is mounted. As a result, the driver can perform accurate judgment and driving.

BRIEF DESCRIPTION OF THE DRAWINGS

FIG. 5(*a*) is an illustration showing the time series of the differential pressure between the upstream and downstream of a DPF when a judgment value for restriction is equal to a judgment value for regeneration in an internal-combustion-engine exhaust gas purifying system according to an embodiment of the present invention;

FIG. 5(*b*) is an illustration showing the time series of the differential pressure between the upstream and downstream of a DPF when a judgment value for restriction is smaller than a judgment value for regeneration in an internal-combustion-engine exhaust gas purifying system according to an embodiment of the present invention; and FIG. 6 is an illustration showing the time series of the differential pressure between the upstream and downstream of a DPF in a conventional internal-combustion-engine exhaust gas purifying system.

DETAILED DESCRIPTION OF THE INVENTION

An exhaust gas purifying system of embodiments of the present invention are described below by using a exhaust gas purifying system having a continuous regenerating DPF system provided with a combination of an oxidation catalyst and a catalyst-provided filter as an example and referring to the accompanying drawings.

Figure 1:
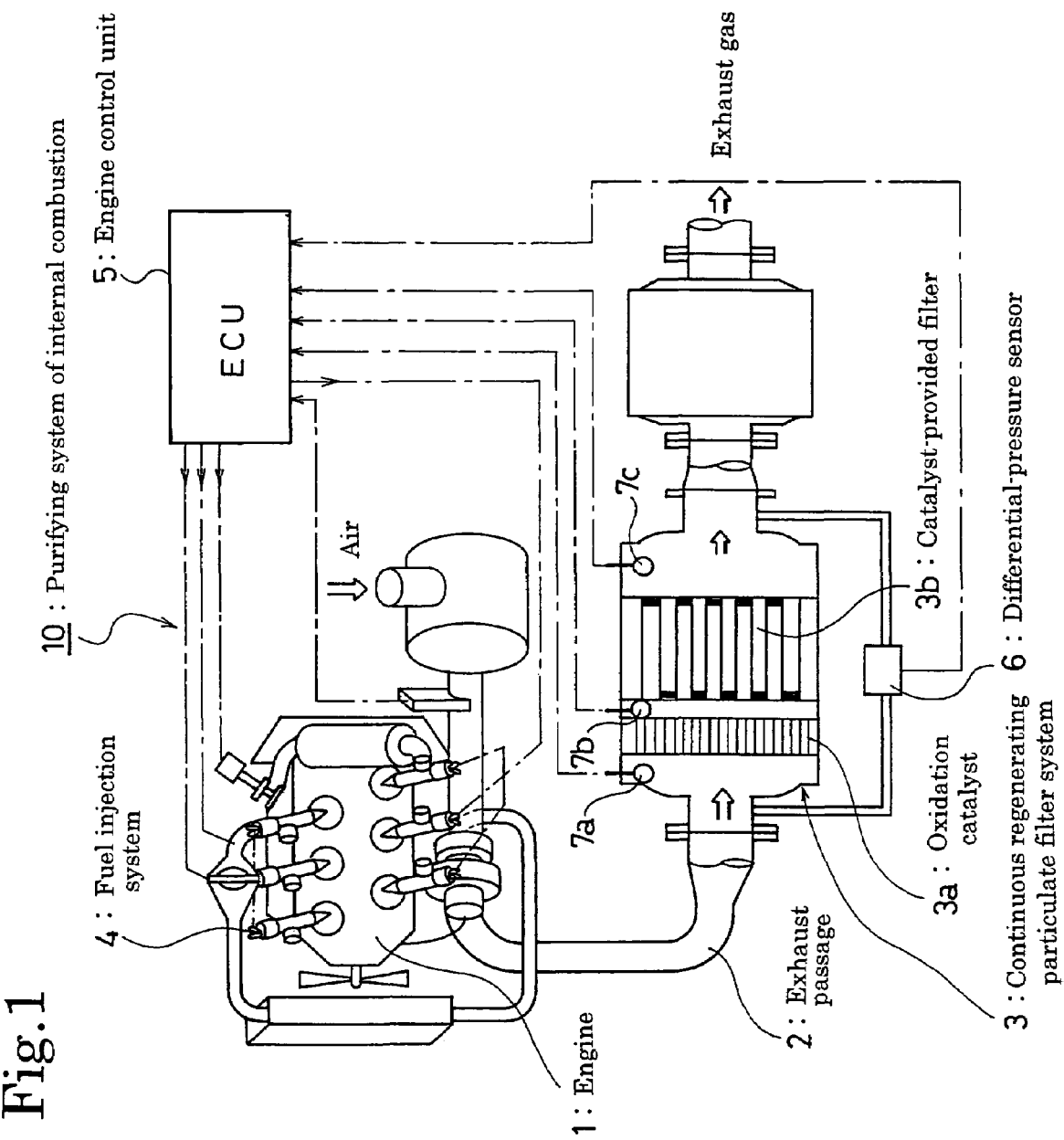
FIG. 1 is a block diagram of an internal combustion engine exhaust gas purifying system according to an embodiment of the present invention.
Figure 2:
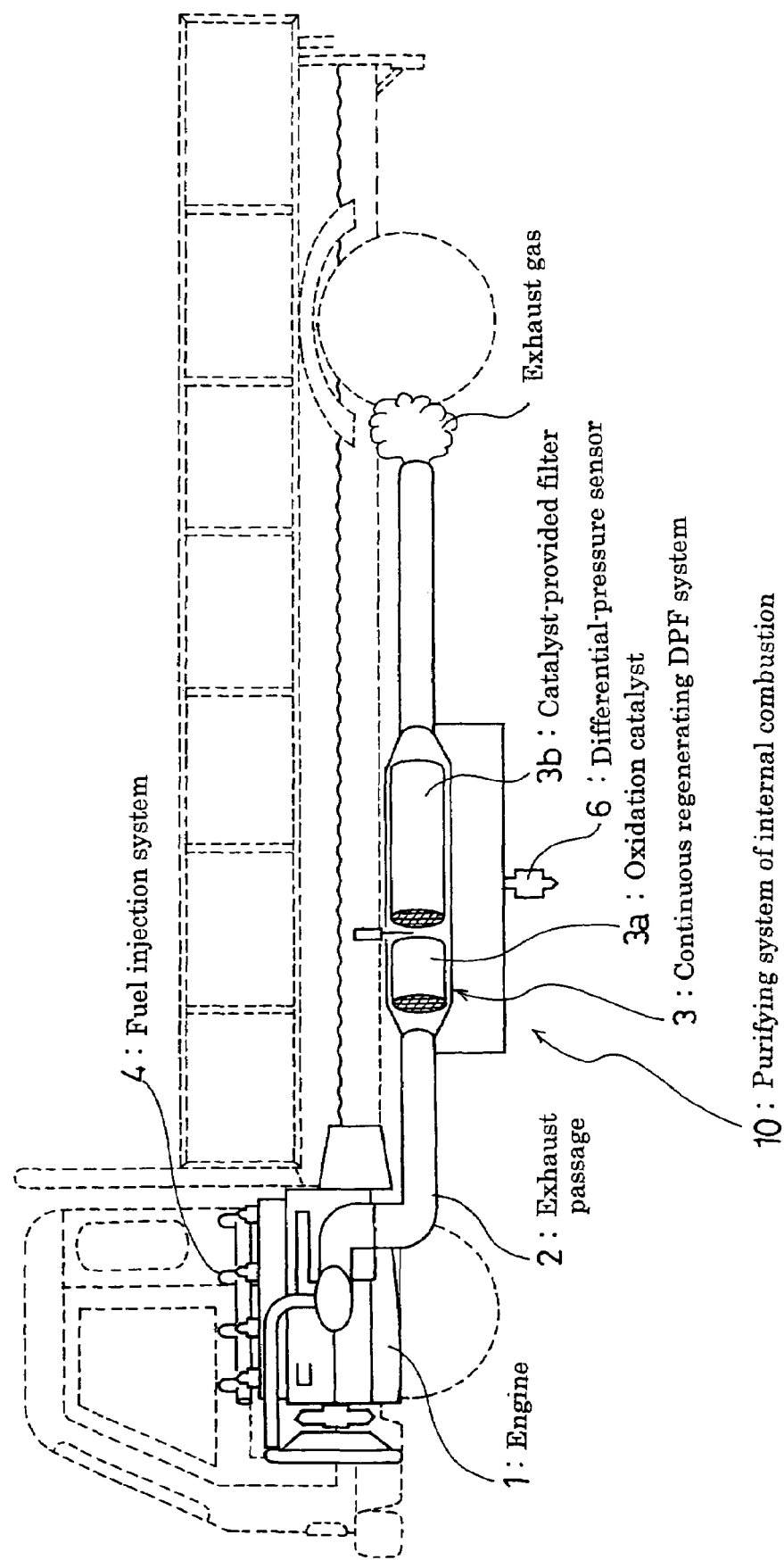
FIG. 2 is an illustration showing a set state of an internal combustion engine exhaust gas purifying system according to an embodiment of the present invention.

FIGS. 1 and 2 show a configuration of an exhaust gas purifying system 10 of an internal combustion engine of the above embodiment. The exhaust gas purifying system 10 of the internal combustion engine is constituted by including a continuous regenerating DPF system 3 which is set to an exhaust passage 2 of an engine (internal combustion engine) 1 and in which an oxidation catalyst 3*a* is set to the upstream side and a catalyst-provided filter (a catalyst-carried DPF) 3*b* is set to the downstream side.

The oxidation catalyst 3*a* is formed by making a porous ceramic support with such a structure as honeycomb type carrying an oxidation catalyst such as platinum (Pt). The catalyst-provided filter 3*b* is formed by a monolith-honeycomb wall-flow filter obtained by alternately closing the inlet and outlet of a porous ceramic honeycomb channel or a pannose filter obtained by laminating inorganic fiber such as alumina at random. The filter portion carries a catalyst such as platinum or cerium oxide.

Then, when using a monolith-honeycomb wall-flow filter for the catalyst-provided filter 3*b*, a particulate matter (hereafter referred to as PM) contained in an exhaust gas is trapped by a porous ceramic wall. Moreover, when using a fibrous filter, the PM is trapped by inorganic fiber of the filter.

Then, to estimate the quantity of deposited PM of a catalyst-provided filter 3b, a differential-pressure sensor 6 is set to a conduction tube connected to the upstream and downstream of a continuous regenerating DPF system 3. Moreover, for regeneration control of the catalyst-provided filter 3b, a first temperature sensor 7a is set to the upstream of an oxidation catalyst 3a at the exhaust gas inlet side, a second temperature sensor 7b is set between the oxidation catalyst 3a and catalyst-provided filter 3b, and a third temperature sensor 7c is set to the exhaust gas exit side of the catalyst-provided filter 3b.

Outputs of these sensors are input to a controller (ECU: engine control unit) 5 which performs not only general control of operations of the engine 1 but also regeneration control of the catalyst-provided filter 3b. Control signals output from the controller 5 control a fuel injection system 4 of the engine 1.

Figure 3:
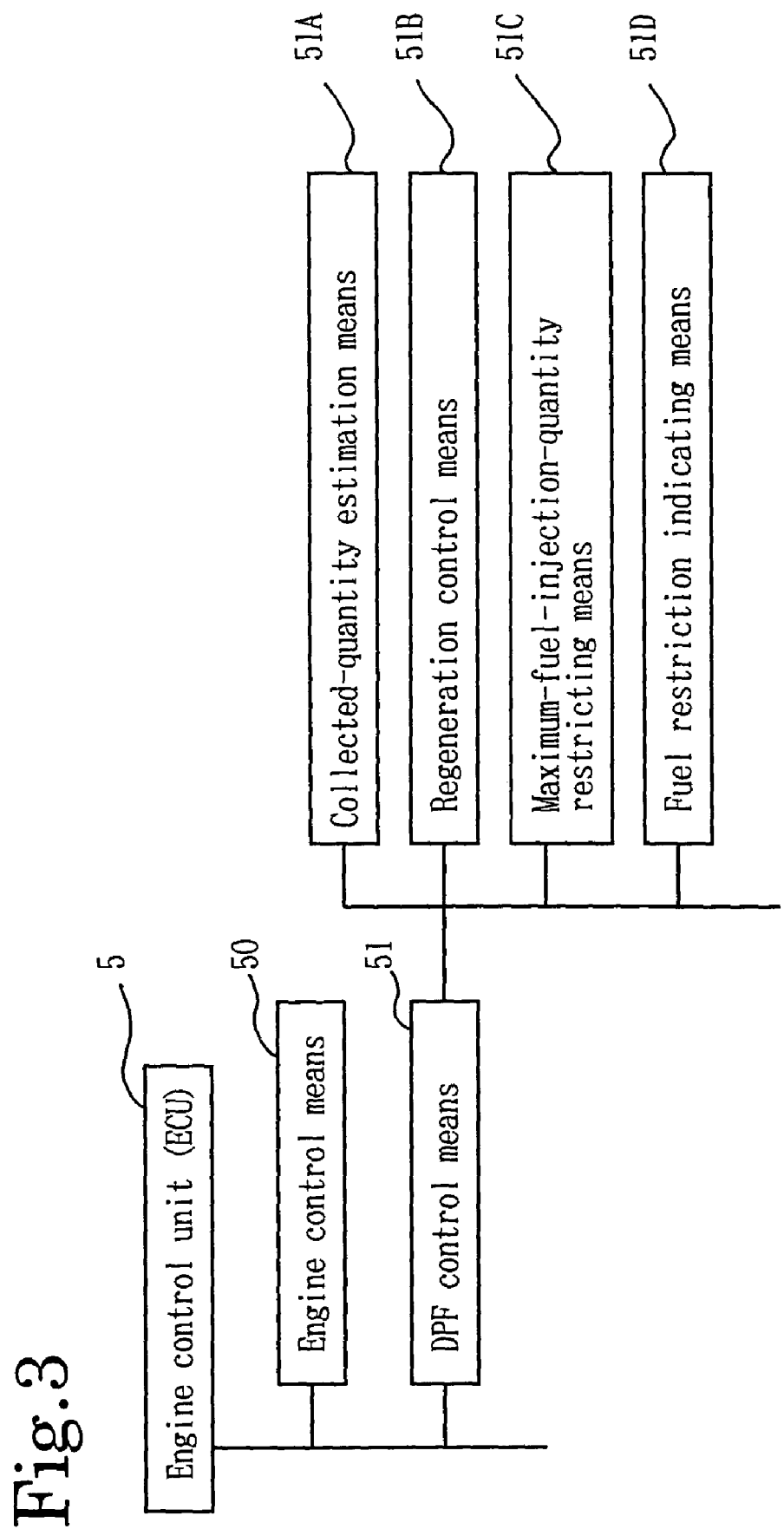
FIG. 3 is an illustration showing a configuration of a controller of an internal-combustion-engine exhaust gas purifying system according to an embodiment of the present invention.

Furthermore, in the case of the present invention, as shown in FIG. 3, DPF control means 51 of a controller 5 is provided with maximum-fuel-injection-quantity restricting means 51C and fuel restriction indicating means 51D in addition to collected-quantity estimation means 51A and regeneration control means 51B.

The collected-quantity estimation means 51A serves as means for estimating the quantity of collected PM in the catalyst-provided filter 3b of the continuous regenerating DPF system 3. The quantity of collected PM is estimated by using the differential pressure $\Delta P$ between the upstream and the downstream of the catalyst-provided filter 3b and relating the differential pressure $\Delta P$ with the quantity of collected PM.

Moreover, the regeneration control means 51B is executed when the differential pressure $\Delta P$ is equal to or more than a predetermined regeneration judgment value (threshold value) $\Delta Pa$. Though this control by the regeneration means is slightly different in the way of controlling by the types of the continuous regenerating DPF system 3, it raises an exhaust gas temperature by delaying (retarding) the timing of the main fuel injection of the engine 1, performing a post injection, or an intake throttling. By raising an exhaust gas temperature, a temperature or an environment suitable for an oxidation and a removal of PM is realized to oxidize and remove the collected PM in the continuous regenerating DPF system 3.

Figure 4:
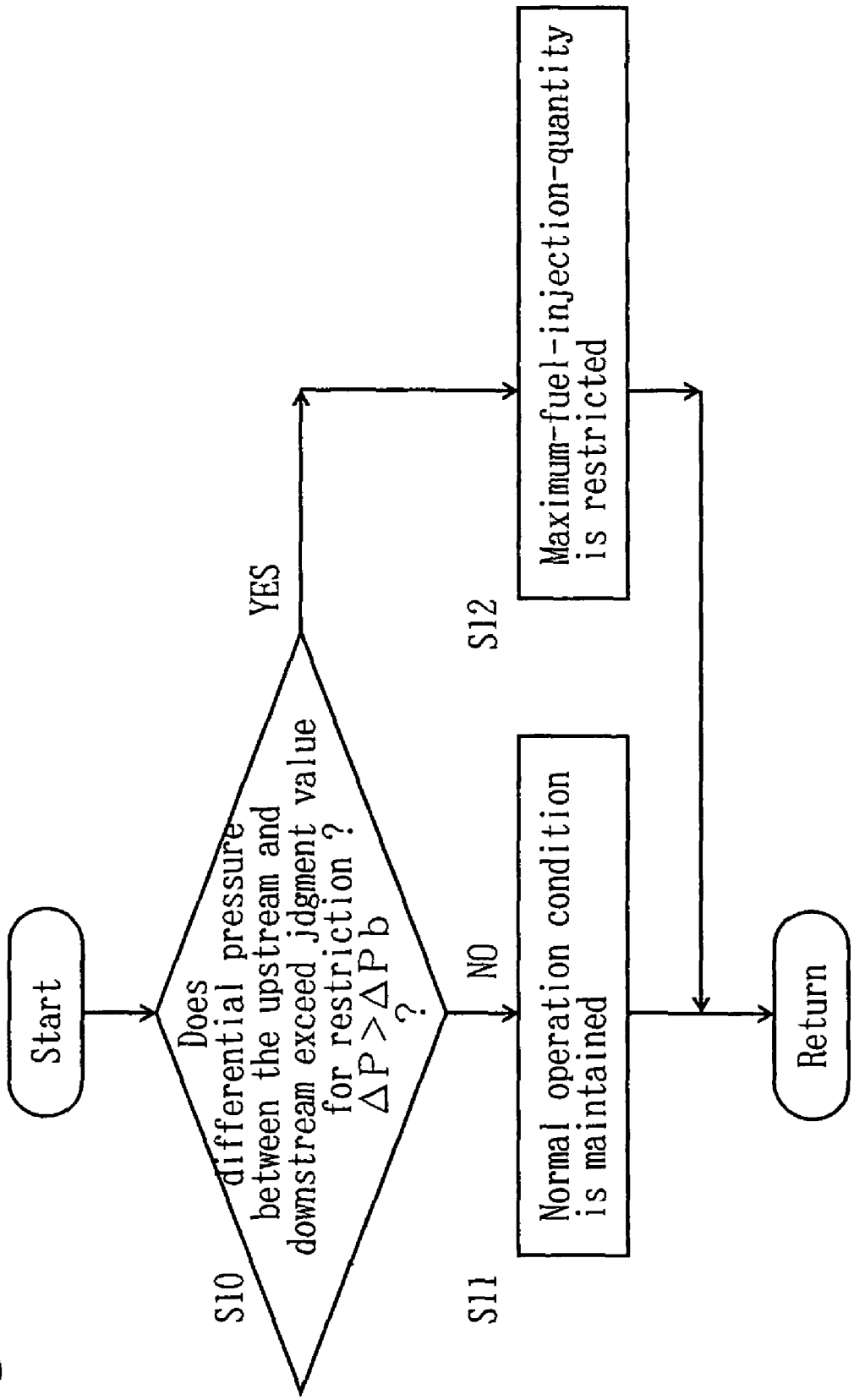
FIG. 4 is an illustration showing a control flow by maximum-fuel-injection-quantity control means.

Furthermore, the maximum-fuel-injection-quantity restricting means 51C serves as means for restricting the maximum fuel injection quantity of an engine 1 when the quantity of collected PM estimated by the collected-quantity estimation means 51A is equal to or more than a predetermined judgment value. As shown by the flow in FIG. 4, this means is constituted so as to restrict the maximum fuel injection quantity when the differential pressure $\Delta P$ between the upstream and downstream of the catalyst-provided filter 3b measured by the differential-pressure sensor 6 exceeds a predetermined judgment value for restriction (threshold value) $\Delta Pb$ and restrict the maximum fuel injection quantity under the normal operation in cases other than the above case. Moreover, the means is constituted so that restriction of the maximum fuel injection quantity is completed when regeneration control is completed.

Furthermore, the fuel restriction indicating means 51D serves as means for warning or notifying an engine operator such as an automobile driver by means of a buzzer or voices that the maximum fuel injection quantity of the engine 1 is restricted or the output of the engine is decreased due to restriction of the maximum fuel injection quantity when or while the maximum-fuel-injection-quantity control means 51C restricts the maximum fuel injection quantity of the engine 1.

The internal combustion engine exhaust gas purifying system 10 having the above configuration restricts the maximum fuel injection quantity when PM is accumulated in the catalyst-provided filter 3b of the continuous regenerating DPF system 3 approximately up to a limit value and the differential pressure $\Delta P$ exceeds the predetermined judgment value $\Delta Pb$ for restriction.

Therefore, even if the engine 1 shifts to a full-load operation state while the PM is accumulated approximately up to the limit value, it is possible to avoid that an exhaust gas quantity greatly increases and the differential pressure $\Delta P$ or an exhaust gas pressure greatly increases because the maximum fuel injection quantity is restricted to a value smaller than the normal maximum fuel injection quantity by the maximum-fuel-injection-quantity restricting means 51C.

FIG. 5 shows a case of performing a high-load operation (or full-load operation) at the point of time t3 close to the point of time t1 at which the differential pressure $\Delta P$ exceeds a judgment value $\Delta Pa$ for regeneration. In this case, as shown in FIG. 5, the differential pressure $\Delta P$ becomes a continuous line showing a maximum-fuel-injection-quantity restriction in which the maximum value of the differential pressure $\Delta P$ is smaller than a dotted line showing the normal operation not restricted by the maximum-fuel-injection-quantity restricting means 51C by $\Delta Pe$. Therefore, because it is possible to avoid the differential pressure $\Delta P$ and an exhaust gas pressure from greatly increasing, the influence on the continuous regenerating DPF system 3 depending on an operation condition is reduced, the body of the engine 1 is protected, and the fuel efficiency becomes advantageous.

FIG. 5(a) shows a case in which the judgment value $\Delta Pb$ for restriction is smaller than the judgment value $\Delta Pa$ for regeneration and in which the maximum fuel injection quantity is restricted from the point of time t2 when the differential pressure $\Delta P$ reaches the judgment value $\Delta Pb$ for restriction and the regeneration control operation is started from the point of time t1 when the differential pressure $\Delta P$ reaches the judgment value $\Delta Pa$ for regeneration.

FIG. 5(b) shows a case in which the judgment value $\Delta Pb$ for restriction when the maximum-fuel-injection-quantity restricting means 51C starts restriction of the maximum fuel injection quantity is the same as the judgment value $\Delta Pa$ for regeneration when the regeneration control means 51B starts regeneration control and in which the maximum fuel injection quantity is restricted from the point of time t2 (=t1) when the differential pressure $\Delta P$ reaches the judgment value $\Delta Pb$ (=$\Delta Pa$) for restriction and at the same time, regeneration control is also started.

Then, because the fuel restriction indicating means 51D is set, it is possible to emit a warning by means of an indication, buzzer, or voices when or while the maximum fuel injection quantity is restricted because the differential pressure $\Delta P$ exceeds the judgment value $\Delta Pb$ for restriction and notify a driver that the maximum fuel injection quantity is restricted.

Therefore, the driver can previously know that the output of the engine 1 is decreased compared to the case of the normal operation due to restriction of the maximum fuel injection quantity.

It is described above that a collected quantity is estimated by the collected-quantity estimation means 51A in accordance with the differential pressure $\Delta P$ between the upstream and downstream of the catalyst-provided filter 3b. However, in this collected-quantity estimation means 51A, it is also possible to estimate the collected quantity by referring to previously input data map with a torque Q and an engine speed Ne showing an operation state of the engine 1, and a DPF inlet temperature measured by the first temperature sensor 7a, calculating a exhausted PM quantity and a purified PM quantity under the above operation state, calculating a PM quantity deposited on the catalyst-provided filter 3b every time, and accumulating the PM quantities. Moreover, it is allowed to use another estimating method.

What is claimed is:

1. An internal combustion engine exhaust gas purifying system having a continuous regenerating diesel particulate filter system in an exhaust passage of an internal combustion engine to oxidize and remove collected particulate matter by performing a regenerating-mode operation when a quantity of the collected particulate matter in a filter of the filter system to collect the particulate matter is greater than or equal to a predetermined judgment value for regeneration, comprising:

collected-quantity estimation means for estimating the quantity of the collected particulate matter in the filter; and maximum-fuel-injection-quantity restricting means for restricting a maximum fuel injection quantity of the internal combustion engine when the quantity of the collected particulate matter estimated by the collected-quantity estimation means is greater than or equal to a predetermined judgment value for restriction, the maximum-fuel-injection-quantity restricting means restricting the maximum fuel injection quantity either during or not during the regenerating-mode operation, said predetermined judgment value for restriction being smaller than said predetermined judgment value for regeneration.

2. The internal combustion engine exhaust gas purifying system according to claim 1, further comprising:

fuel restriction indicating means for indicating restriction of the maximum fuel injection quantity of the internal combustion engine when or while the maximum-fuel-injection-quantity restricting means restricts the maximum fuel injection quantity.

3. The internal combustion engine exhaust gas purifying system according to claim 1, wherein the collected-quantity estimation means estimates the quantity of collected particulate matter in accordance with a differential pressure between the upstream and downstream of the filter.

4. The internal combustion engine exhaust gas purifying system according to claim 1, wherein the continuous regenerating diesel particulate filter system uses one of the following three systems: a system constituted by making the filter carrying a catalyst, a system constituted by setting an oxidation catalyst to the upstream side of the filter, and a system constituted by making the filter carrying a catalyst and setting an oxidation catalyst to the upstream side of the filter.

5. A method of purifying an internal combustion engine, comprising:

estimating a quantity of particulate matter collected in a filter in the engine;

oxidizing and removing the particulate matter collected in the filter when the estimated guantity is greater than or equal to a first judgment value; and restricting a maximum fuel injection quantity of the internal combustion engine when the quantity is greater than or equal to a second judgment value, either during or not during the oxidizing and removing, wherein the oxidizing and removing are performed independently from the restricting of the maximum fuel injection quantity, said second judgment value being smaller than said first judgment value.

6. A method of purifying an internal combustion engine, comprising:

oxidizing and removing particulate matter collected in a filter of the engine when a pressure differential between upstream and downstream sides of the filter is greater than or equal to a first judgment value; and restricting a maximum fuel injection quantity of the internal combustion engine when the pressure differential is greater than or equal to a second value, said second value being smaller than said first value.

* * * * *